United States Patent [19]
Abramovitz

[11] Patent Number: 5,396,359
[45] Date of Patent: * Mar. 7, 1995

[54] NODE FOR GRID TYPE SINGLE MODE FIBER OPTIC LOCAL AREA NETWORK USING TUNABLE FILTERS

[75] Inventor: Irwin J. Abramovitz, Baltimore City, Md.

[73] Assignee: The United States of America as represented by the Secretary of the Air Force, Washington, D.C.

[ * ] Notice: The portion of the term of this patent subsequent to Jul. 7, 2010 has been disclaimed.

[21] Appl. No.: 975,454

[22] Filed: Nov. 12, 1992

[51] Int. Cl.⁶ .............................................. H04J 14/00
[52] U.S. Cl. .................................... 359/127; 359/117; 359/128
[58] Field of Search ............... 359/117, 128, 139, 118, 359/119, 124, 127; 370/60, 60.1, 94.1, 94.3

[56] References Cited
U.S. PATENT DOCUMENTS
5,128,789  7/1992  Abramovitz ..................... 359/128

*Primary Examiner*—Leslie Pascal
*Attorney, Agent, or Firm*—Robert L. Nathans; Samuel B. Smith, Jr.

[57] ABSTRACT

Apparatus for processing data packets within a grid-based mesh network having a plurality of particular nodes at the intersections of rows and columns of data transmission links which link the nodes together, which apparatus can determine if a particular incoming data packet has previously been re-transmitted through a particular node or has a wavelength of a data packet currently being processed through the node and, a plurality of tunable filters for blocking a data packet from being re-transmitted if the packet has such a wavelength or was previously re-transmitted through the nodes.

6 Claims, 3 Drawing Sheets

NODE FOR GRID TYPE SINGLE MODE FIBER OPTIC LOCAL AREA NETWORK USING TUNABLE FILTERS

STATEMENT OF GOVERNMENT INTEREST

The invention described herein may be manufactured and used by or for the Government for governmental purposes without the payment of any royalty thereon.

BACKGROUND OF THE INVENTION

The past few years have seen enormous growth in the field of fiber optic communications. The distances over which reliable communications operate have been increased, as have the bandwidths and the number of installed systems. Wavelength division multiplexing (WDM) is a method by which many messages can be sent simultaneously at different optical wavelengths with interference only between simultaneous messages at the same wavelength. WDM has greatly increased the traffic capacity of an optical fiber link, and local area network (LAN) configurations have been developed. Most of these systems have been developed for civilian or nontactical military communications for which the probability of a link outage is remote. Thus, most LANs employ star, ring, or bus architectures.

Task 1 of The Westinghouse single mode fiber optical LAN (SMOLAN) began by examining single mode fiber optic communications architectures for tactical LANs. LANs using star, ring, or bus architectures cannot provide the redundancy required for reliable communications in a tactical military situation in which links are subject to damage from the movement of military equipment and vehicles as well as enemy action (artillery, air strikes, etc.). In addition, these architectures cannot provide the flexibility required for communications with dispersed, frequently relocating units or elements. Irregular grid networks were selected as the architecture most suitable for providing this service.

Grid and gridlike networks can be evaluated by examining a simple two-way grid as shown in FIG. 1 of U.S. Pat. No. 5,128,789 issued to Irwin Abramovitz, and incorporated by reference herein. The present invention is a variation of the system disclosed therein. Such a grid can be assembled to cover, for example, a 10 km × 10 km area in which dispersed units will connect to the nearest node each time they relocate. Several routing techniques were investigated and evaluated. A highly desirable technique is to "flood" the network, providing the message to all nodes, so that the system need not know at which node a particular unit is located. Thus, no configuration or reconfiguration following a unit's move is required. The grid network provides a large number of redundant paths, ensuring a very high probability that a path will exist even in the face of significant network damage (many links out). It is this desirable multiplicity of paths, however, that creates the most severe obstacle to implementation of such a grid network: severe signal degradation and inter-symbol interference. This problem results from the fact that all such "shortest paths" will not be of identical length. There are longer multiple paths as well.

The solution to this problem is twofold: (1) a switching algorithm that does not allow multiple paths yet takes advantage of path redundancy when damage occurs, and (2) a functional node design to implement that algorithm. This routing-by-"flooding" algorithm offers advantages: because all nodes will receive the message, the system does not need to know where a node is located (except for each node knowing the units attached to it); thus, no configuration or reconfiguration is required. Further, no central control is required (a central control would make the network vulnerable to the loss of the controller and/or add the complexity of backup controllers). In other words, switching should take place based upon information normally passing through the node. Such an algorithm in a system using WDM would accept only one message at a time (the first one to arrive) at each wavelength from among the several inputs to the node and would further pass the same message only once; if a message appeared a second time it would be stopped. The accepted inputs would be passed along to all attached nodes. A message would have a finite lifetime within the network because, after a given time, it would have reached all nodes so no node would be passing it. Therefore, the list of messages (message IDs) already passed can be purged of old messages and would not grow to a significantly large number. This switching algorithm is, in fact, self-routing and finds the shortest path between sender and receiver, and is discussed in the aforesaid patent to Abramovitz and herein.

A preliminary architecture has been developed under Task 1 for a node designed to implement the required node functions. This node design is shown in FIG. 3 of the aforesaid patent for one of several node input lines. Other node input lines would use identical hardware, sharing a common controller and joining the output of this hardware at an N-to-one coupler as shown.

Considering only one of several input fibers to the node, the input fiber is split, providing signal to both an optical spectrum analyzer (OSA) and a fiber optic delay (several feet of optical fiber). The OSA determines the wavelengths present. If on/off keying is used to transmit the message header information, the OSA may even detect the message ID number. OSA output goes to the controller which determines which wavelengths are to be passed (and which are to be stopped). A common controller accepts and processes information from the several OSAs, each associated with an input to the node. The controller implements the aforesaid switching algorithm as previously described with these requirements:

1. If a wavelength is present on more than one input, pass only the signal that appeared first.
2. Do not pass the same message more than once.

The delay holds the optical signals long enough for the OSA and controller to set up the appropriate optical switches. The OSA could be grating or other angularly dispersive device that separates the input signals by wavelength, lenses, and photodetector array. Following the delay, the optical signals are again demultiplexed by an angularly dispersive device similar to that for the OSA. Since these spatially separated wavelengths or channels are not far enough apart, and lack gaps in between, in order to couple to a monolithic set of on/off optical switches, focal plane dissector techniques are used to route or fan out these optical signals into an array of switches.

Under the direction of the controller, the various optical channels are switched by an array of parallel optical switches. Next, inverse star couplers are used to bring together groups of channels for multiplexing. These channels must be multiplexed into several groups of limited optical bandwidth since optical amplifiers have limited gain-bandwidth products. Following amplification, the optical signals may be multiplexed into one full-bandwidth fiber and summed with similar signals from the other inputs to the node in an N-to-one coupler. This combined output may then be split in a one-to-N coupler and sent out to the attached nodes.

Such a node allows implementation of a SMOLAN using WDM, potentially incorporating up to 500 wavelengths (channels), each modulated to 20 GHz, thus providing a system information bandwidth on the order of 10 GHz.

Wavelength division multiplexing (WDM) was selected over alternative multiplexing schemes because of the large number of channels available in the 1.2-to 1.6 micrometer band, its compatibility with the selected routing technique and switching algorithm, and its potential use together with packet switching. Code division multiple access (CDMA) and time division multiplexing (TDM) are not compatible with the switching algorithm described above since different simultaneous messages cannot be readily separated to permit the passing of some and the stopping of others.

System considerations can influence required device parameters in other ways as well. In a source-driven WDM system, each receiver has its own unique wavelength; the transmitter sends its message at the receiver's wavelength.

Thus, a receiver may use a narrow-band laser local oscillator (in a coherent system requiring a local oscillator), while a transmitter must have a tunable laser, although the tuning speed need not be particularly fast (perhaps many milliseconds).

On the other hand, in a sink-driven system, for which each transmitter has its own unique wavelength, the receiver must tune to each transmission intended for it. Therefore, a transmitter may use a narrow-band laser, and a receiver must use a tunable laser. This tunable laser, however, must tune very rapidly (on the order of tens of nsec) so that the beginning of incoming messages will not be lost. Optical fiber delays of tens of nanoseconds (requiring tens of feet of optical fiber) may be used to hold the message during laser tuning, but larger delays are impractical.

At a high traffic site such as a headquarters, it may be desirable to provide for multiple simultaneous messages by using several receivers there. In a source-driven system, several fixed wavelengths would be assigned. However, a transmitter would not necessarily know which of those wavelengths are in use. In a sink-driven system, each receiver there would tune to a different transmitter, and a similar problem would not develop.

Due to its high bandwidth potential and other factors, single mode fiber optical communications are being considered within the military community for tactical local area networks. In a tactical environment, star, ring and bus architectures may be replaced by grid or grid-like networks in order to provide a large multiplicity of paths to ensure reliable communications. It is this large number of paths, however, which creates a severe multipath problem resulting in intolerable signal degradation and intersymbol interference. Thus there is a need for a unique node design which addresses this problem.

The solution to this multipath problem involves a switching algorithm which does not allow multiple paths yet takes advantage of path redundancy when damage occurs, and a node design to implement that algorithm. The advantages of a "flooding" algorithm has been previously mentioned, i.e., since all nodes will receive the message, a node need not know where a unit is located (except those units directly attached) and thus no configuration or reconfiguration is required. Further, it is desirable that no central control be required since that would make the network vulnerable to loss of the controller and/or add the complexity of back-up control. In other words, the switching takes place based upon information normally passing through the node in accordance with the aforesaid switching algorithm. Such an algorithm in a system employing wavelength division multiplexing many messages may be sent simultaneously on different wavelengths with interference only between simultaneous messages at the same wavelength would accept only one message at a time, the first one, at the same wavelength from among the several node inputs, and would further pass a message only once, i.e., if a message appears a second tie it would be stopped. The accepted inputs would be passed along to all attached nodes. Since a message would have a finite lifetime within the network (after a given tie it will have reached all nodes so no node will be passing it), the list of messages already passed (message ID's) may be purged of old messages and would not grow to a significantly large number.

Ideally, the node would be able to handle a large number of simultaneous wavelengths, for example, 500 wavelengths (channels) each modulated to 20 GHz bandwidth between 1.2–1.6 micrometers. This would ordinarily require an extremely complex node, providing a communications capability far in excess of near-term needs. A more practical near-term node, limited in the number of simultaneous wavelengths, is the subject of this invention.

BRIEF SUMMARY OF THE INVENTION

Apparatus for processing data packets within a grid-based mesh network having a plurality of particular nodes at the intersections of rows and columns of data transmission links which link the nodes together, which apparatus can determine if a particular incoming data packet has previously been re-transmitted through a particular node or has a wavelength of a data packet currently being processed through the node and, further including a plurality of tunable filters for blocking a data packet from being re-transmitted if the packet has such a wavelength or was previously re-transmitted through the nodes. By buffering all transmissions and sending them at an extremely high data rate, such as 10 gigabits per second, a very low duty cycle is achieved and the probability of more than only a few wavelengths in use at any one time is remote.

BRIEF DESCRIPTION OF THE DRAWINGS

Other objects, features and advantages of the present invention will become apparent upon study of the following description taken in conjunction with the drawings in which.

DETAILED DESCRIPTION

Figure 1:
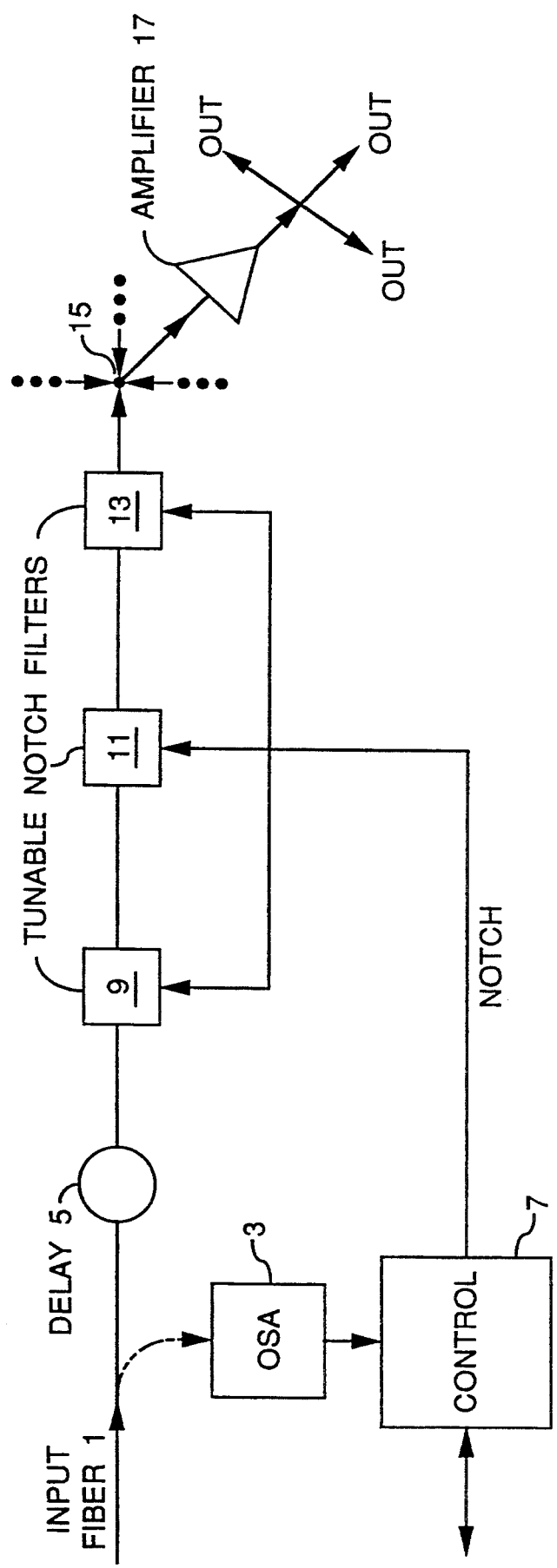
FIG. 1 schematically illustrates a first embodiment of the invention.

The first embodiment of the invention is shown in FIG. 1. A similar configuration is found on all node input lines but is detailed for only one input line here.

The input fiber 1 is split, providing signal to both an optical spectrum analyzer (OSA) 3 and a fiber optical delay 5 consisting of several feet of optical fiber. The OSA determines the wavelengths present and, if on/off keying is used to transmit the header information, may even detect message identification (ID) number. OSA output goes to the controller 7 which determines which wavelengths are to be passed, and which are to be stopped. As explained in detail in the aforesaid patent, a common controller accepts and processes information from all node input OSA's and, in accordance with the present invention, controls the tunable notch filters 9, 11, and 13. The controller implements the switching algorithm previously described:

(1) If the same wavelength is present at more than one input, pass only the signal which appeared first; and (2) do not pass the same message more than once.

OSA 3 may consist of an angularly dispersive device such as a grating which separates the wavelengths and a photodetector array to detect the signals, as well as necessary lenses, and other components. See the prior art description of FIG. 3 of the Abramovitz patent. The delay introduced by delay device 5, holds the optical signals long enough for the OSA 3 and controller 7 to set up the filters. The tunable notch filters are tuned to the wavelengths of messages to be stopped. One current technology capable of performing this function is the acousto-optic tunable filter (AOTF), although it tunes too slowly to be used effectively here. Other techniques are known in the art and which are practical for this function, such as fiber Fabry-Perot filters. The filtered outputs from the several inputs are combined at junction 15, are amplified by amplifier 17, and passed on to the other surrounding nodes. The number of filters available will affect the probability of collisions, when signals that should be stopped cannot be stopped since all filters are in use. In such cases, the signals may be stopped at the next nodes along the signal paths.

Figure 2:
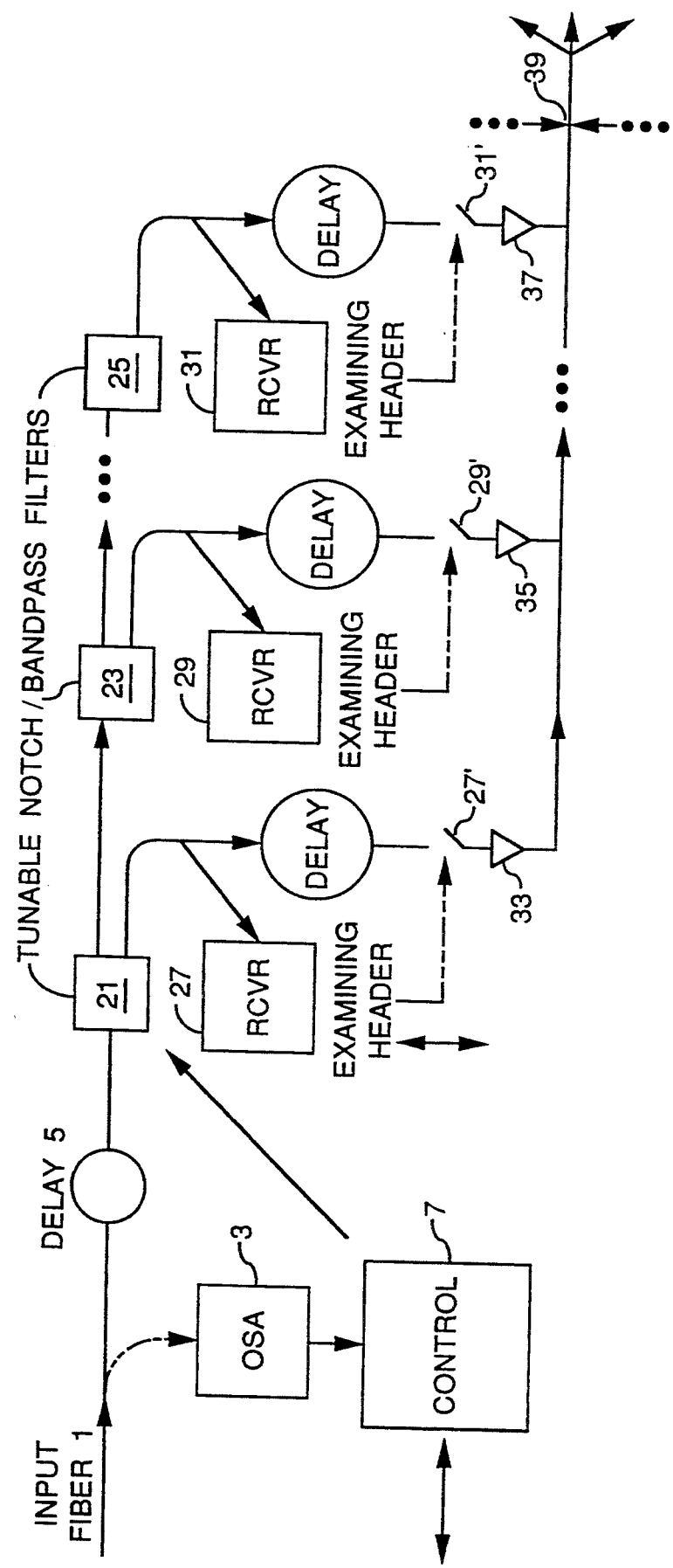
FIG. 2 illustrates a second embodiment of the invention.

A second embodiment of the invention is shown in FIG. 2. Here, tunable bandpass/notch filters 21, 23, and 25 are used, so that selected wavelengths which may be passed, as opposed to wavelengths to be stopped, are notched from the input path and redirected by the bandpass side of the filter to a receiver such as 27, 29, and 31. Headers requiring some processing may be used since each filter has an associated detector or receiver. If the header further indicates that the signal should be passed, an optical switch such as 27, 29 and 31, is closed; the signal is then amplified by amplifiers 33 35 and 37 and combined into the output path 39 as before. Again, the OSA 3 operates as before to set the filters to the appropriate wavelengths.

Figure 3:
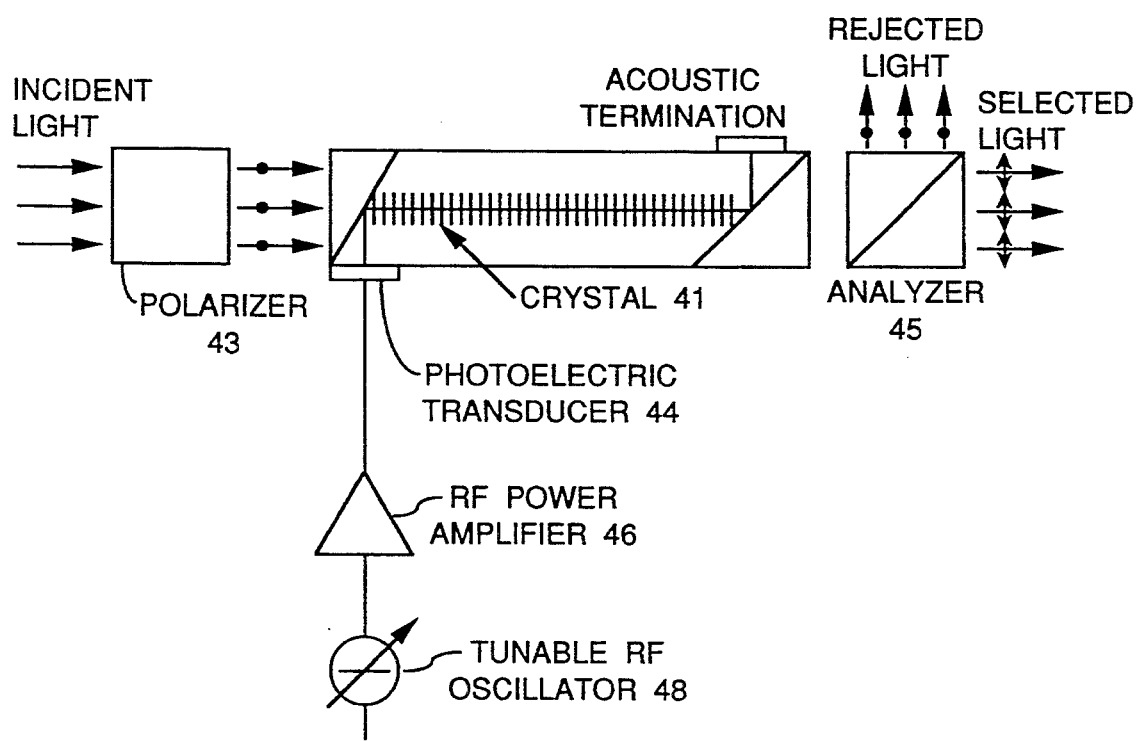
FIG. 3 shows a prior art acousto-optic filter.

The prior art acousto-optic tunable filter (AOTF), shown in FIG. 3, may also be configured as a suitable bandpass/notch filter. A polarized light beam emerging from polarizer 43 and an acoustic wave produced by transducer 44, driven by RF power amplifier 46, and tunable oscillator 48, colinearly propagate along crystal material 41. If the frequency of the acoustic wave is tuned to phase-match a particular light frequency (wavelength), polarization rotation of the wavelength light results. An analyzer 45 may reject the rotated polarization, resulting in a notch filter, or may select the rotated polarization producing a bandpass filter; if a polarizing beamsplitter is used in place of the analyzer, both the notch and bandpass outputs may be recovered. In this second embodiment of the invention shown in FIG. 2, each individual wavelength is separately amplified, which may be more easily accomplished since amplifiers have limited gain-bandwidth. If more messages (wavelengths) are in use than can be handled by the limited number of filters, the messages are lost on this path and must find another route. With the redundant number of paths in a grid, this is quite likely.

The controller's message list need not keep a message number and/or wavelength in it's list for the lifetime of the message anywhere in the network. A message number must be in a node's list only as long as the same message may possibly reappear at a node. Once a node receives a message, the node passes it along to all attached nodes. They, in turn, send it only once to their attached nodes, including the sender. After receiving this "echo" from all attached nodes, except the node from which it originally came, there is no attached node which has not passed it once, so it cannot arrive again. An "echo" may arrive sooner than expected if an attached node received the message via another path and was in the process of sending it out when it arrived from the node under discussion. Thus, the time between the first start of a new message to the start of the last time it will be seen will be at most twice the time of the longest path to an attached node. If the longest path to an attached node is 2 kilometers, then this time is about 12 microseconds Since one would expect the number of different messages passing through a node in 12 microseconds to be rather small, this list should remain small. This assumes that a node (which will receive and echo back, can always accept a message. If there are not enough filters, then the message must find another path and the "echo-back" will be delayed.

A more quantitative analysis of the number of simultaneous messages passing through a node is desirable here to both verify that the number of required filters need not be large and to insure that the above rationale for the short wavelength and message lists is valid. For this analysis assume a scenario of 500 active telephone conversations equal to 1000 one-way messages, each digitized at 10,000 samples per second (8,000 is standard) of ten bits each (8 is standard) resulting in 100,000 bits per second. These messages are sent in one-tenth second packets of 10,000 bits each at a rate of 10 gigabits/sec giving a packet duration of 1 micro-sec occurring every one-tenth second.

The probability of receiving a particular packet is its duration divided by its frequency of occurrence or 10 microsec/0.1 sec which equals 10. Since the 999 other packets will arrive in an independent, random manner, one may use Poissan's formula to calculate the probability of multiple messages:

$$P(K) = \frac{\lambda^k}{K!} e^{-\lambda}$$

where $\lambda$=the probability of a single packet multiplied by the number of packets. The results are shown below for zero, one, two, three, and four simultaneous packets, and the sum:

P(0)=0.99004983374917
P(1)=0.00990049833749
P(2)=0.00004950249169
P(3)=0.00000016500830
P(4)=0.00000000041252
P(0<k<4)=0.99999999999917

Thus the probability of a packet not being accepted at a node due to five or more messages arriving at the same time is only 0.00000000000083. If a message (packet) or wavelength is on a list for 20 microsec, allowing some margin from the previous 12 microsec, the probability becomes 20 microsec/0.1 sec which equals 0.0002, and the probability of list sizes is given below:

P(0)=0.81873075307798
P(1)=0.16374615061560
P(2)=0.01637461506156
P(3)=0.00015806236339
P(4)=0.00000377015591
P(0<k<4)=0.99999774180945
P(0<k<6)=0.99999999786752

A few additional filters may be added to handle a moderate number of high data rate channels. For ten channels continually sending data at 10 megabits per second and time compressed (bandwidth expanded) to packets at a 1% duty cycle and 10 gigabits per second data rate, the probability of simultaneously packets is given below:

P(0)=0.90483741803596
P(1)=0.09048374180360
P(2)=0.00452418709018
P(3)=0.00015806236339
P(4)=0.00000377015591
P(0<k<4)=0.99999992332198

For twenty such high data rate users, the probability of four or fewer simultaneous packets is 0.9999977180945. Thus, a near term node with limited demultiplexing may be very effective.

Since numerous variations in the practise of the invention will be apparent to the skilled worker in the art, the scope of the invention is to be limited only to the terms of the following claims and art recognized equivalents thereof.

I claim:

1. Apparatus for processing data packets within a grid-based mesh network having a plurality of particular nodes at the intersections of rows and columns of data transmission links which link the nodes together, comprising:
    (a) controller means for determining if a particular incoming data packet has previously been re-transmitted through said particular node;
    (b) blocking means within each node for blocking re-transmission of said particular incoming data packet if said controller means determines that said data packet has previously been re-transmitted through said particular node, and if not, retransmitting said particular data packet to neighboring nodes, said blocking means further including at least several tunable notch filters.

2. The apparatus of claim 1 wherein said tunable notch filters are coupled in tandem to the output junction of said particular node.

3. Apparatus for processing data packets within a grid-based mesh network having a plurality of particular nodes at the intersections of rows and columns of data transmission links which link the nodes together, comprising:
    (a) means for identifying the wavelength of an incoming data packet incoming into a particular node and stopping further processing of said incoming data packet through said node if another data packet having said wavelength is currently being processed within said particular node;
    (b) means for determining if a particular incoming data packet has previously been re-transmitted through said particular node;
    (c) blocking means for blocking re-transmission of said particular data packet if said data packet has previously been re-transmitted through said node, and if not, re-transmitting said particular data packet to neighboring nodes; and
    (d) wherein said blocking means includes tunable notch filter means.

4. The apparatus of claim 3 wherein said tunable notch filter means comprises at least several tunable notch filters coupled in tandem to the output junction of said particular node.

5. Apparatus for processing data packets within a grid-based mesh network having a plurality of particular nodes positioned at intersections of rows and columns of data transmission links which link the nodes together, comprising:
    (a) means for identifying the wavelength of an incoming data packet incoming into a particular node;
    (b) means for determining if a particular incoming data packet has previously been re-transmitted through said particular node;
    (c) blocking means for blocking further processing of said incoming data packet through said node if another data packet having said wavelength is currently being processed within said particular node and for blocking re-transmission of said particular data packet if said data packet has previously been re-transmitted through said node, and if not, re-transmitting said particular data packet to neighboring nodes; and
    (d) wherein said blocking means includes tunable notch filter means.

6. The apparatus of claim 5 wherein said tunable notch filter means comprises at least several tunable notch filters coupled in tandem to the output junction of said particular node.

* * * * *